US008883904B2

(12) United States Patent
Roth et al.

(10) Patent No.: US 8,883,904 B2
(45) Date of Patent: Nov. 11, 2014

(54) MIXTURES OF SILVER AND ZINC OXIDE AS STABILIZER FOR FLAME-RETARDANT POLYAMIDES

(75) Inventors: Michael Roth, Lautertal (DE); Thomas Weiss, Ilvesheim (DE); Edoardo Menozzi, Basel (CH)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/617,570

(22) Filed: Sep. 14, 2012

(65) Prior Publication Data

US 2013/0072606 A1  Mar. 21, 2013

Related U.S. Application Data

(60) Provisional application No. 61/534,904, filed on Sep. 15, 2011.

(51) Int. Cl.
| C08L 77/06 | (2006.01) |
| C08K 3/22 | (2006.01) |
| C08K 9/02 | (2006.01) |
| C08K 13/02 | (2006.01) |
| C08L 77/00 | (2006.01) |
| C08L 23/26 | (2006.01) |

(52) U.S. Cl.
CPC ............... *C08K 13/02* (2013.01); *C08L 77/00* (2013.01); *C08L 77/06* (2013.01); *C08L 23/26* (2013.01)
USPC ........................... 524/440; 524/414; 524/432

(58) Field of Classification Search
USPC ........................... 524/440, 414, 432
See application file for complete search history.

(56) References Cited

U.S. PATENT DOCUMENTS

| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,512,606 A | 6/1950 | Bolton et al. |
| 3,393,210 A | 7/1968 | Speck |
| 3,778,407 A | 12/1973 | Hild et al. |
| 3,883,475 A | 5/1975 | Racky et al. |
| 4,148,846 A | 4/1979 | Owens et al. |
| 4,208,317 A | 6/1980 | Cerny et al. |
| 4,360,617 A | 11/1982 | Muller et al. |
| 4,396,742 A | 8/1983 | Binsack et al. |
| 4,537,949 A | 8/1985 | Schmidt et al. |
| 4,540,772 A | 9/1985 | Pipper et al. |
| 4,550,133 A | 10/1985 | Nielinger et al. |
| 4,670,487 A | 6/1987 | Nielinger et al. |
| 4,771,109 A | 9/1988 | Eichenauer et al. |
| 4,873,289 A | 10/1989 | Linder et al. |
| 4,882,381 A | 11/1989 | Wittmann et al. |
| 5,010,135 A | 4/1991 | Eckel et al. |
| 5,049,599 A | 9/1991 | Steiert et al. |
| 5,081,222 A | 1/1992 | Reimann et al. |
| 5,272,236 A | 12/1993 | Lai et al. |
| 5,466,741 A | 11/1995 | Bonin et al. |
| 6,084,012 A | 7/2000 | Gareiss et al. |
| 6,136,892 A * | 10/2000 | Yamauchi et al. ............. 523/206 |
| 6,194,538 B1 | 2/2001 | Weiss et al. |
| 6,645,625 B2 * | 11/2003 | Horold et al. ................. 428/402 |
| 6,699,960 B1 | 3/2004 | Ohlbach et al. |
| 7,589,142 B2 * | 9/2009 | Maeda et al. ................. 524/444 |
| 2006/0235191 A1 | 10/2006 | Deininger et al. |
| 2007/0173573 A1 * | 7/2007 | Urata et al. .................... 524/115 |
| 2008/0255279 A1 * | 10/2008 | Neuhaus et al. ............. 524/100 |
| 2009/0012229 A1 | 1/2009 | Desbois et al. |

FOREIGN PATENT DOCUMENTS

| CA | 1284016 C | 5/1991 |
| DE | 1931387 A1 | 12/1970 |
| DE | 2308104 A1 | 8/1974 |
| DE | 2625691 A1 | 12/1976 |
| DE | 2702661 | 8/1977 |
| DE | 37 25 576 A1 | 2/1989 |
| DE | 38 00 603 A1 | 7/1989 |
| DE | 196 48 503 A1 | 5/1998 |
| DE | 10313681 A1 | 10/2004 |
| EP | 38 094 A2 | 10/1981 |
| EP | 38 582 A2 | 10/1981 |
| EP | 39 524 A1 | 11/1981 |
| EP | 50265 A1 | 4/1982 |
| EP | 0128341 A2 | 12/1984 |
| EP | 129195 A2 | 12/1984 |
| EP | 129196 A2 | 12/1984 |
| EP | 176 836 A2 | 4/1986 |
| EP | 208187 | 6/1986 |
| EP | 0195301 A2 | 9/1986 |
| EP | 235 690 A2 | 9/1987 |
| EP | 299444 A2 | 1/1989 |
| EP | 0319290 A2 | 6/1989 |
| EP | 384 232 A1 | 8/1990 |
| EP | 922065 A2 | 6/1999 |
| EP | 1198491 A1 | 4/2002 |
| EP | 1741754 A1 | 1/2007 |
| EP | 1994075 A2 | 11/2008 |
| WO | WO-2011023584 A2 | 3/2011 |

OTHER PUBLICATIONS

International Search Report for PCT/EP2012/066935, dated Oct. 19, 2012.

* cited by examiner

*Primary Examiner* — Brieann R Fink
(74) *Attorney, Agent, or Firm* — Drinker Biddle & Reath LLP

(57) ABSTRACT

Thermoplastic molding compositions comprising
A) from 10 to 99.8% by weight of a thermoplastic polyamide,
B) from 0.1 to 60% by weight of red phosphorus,
C) from 0.05 to 20% by weight of a stabilizer mixture C) composed of, based on 100% of C),
  $C_1$) from 10.1 to 99.9% by weight of elemental Ag and
  $C_2$) from 0.1 to 89.9% by weight of ZnO,
D) from 0 to 40% by weight of an impact modifier, and
E) from 0 to 60% by weight of further additives,
where the sum of the percentages by weight of A) to E) is 100%.

10 Claims, No Drawings

MIXTURES OF SILVER AND ZINC OXIDE AS STABILIZER FOR FLAME-RETARDANT POLYAMIDES

CROSS-REFERENCE TO RELATED APPLICATIONS

This application claims benefit (under 35 USC 119(e)) of U.S. Provisional Application 61/534,904, filed Sep. 15, 2011, which is incorporated by reference.

The invention relates to thermoplastic molding compositions comprising
A) from 10 to 99.8% by weight of a thermoplastic polyamide,
B) from 0.1 to 60% by weight of red phosphorus,
C) from 0.05 to 20% by weight of a stabilizer mixture C) composed of, based on 100% of C),
  $C_1$) from 10.1 to 99.9% by weight of elemental Ag and
  $C_2$) from 0.1 to 89.9% by weight of ZnO,
D) from 0 to 40% by weight of an impact modifier, and
E) from 0 to 60% by weight of further additives,
where the sum of the percentages by weight of A) to E) is 100%.

The present invention further relates to the use of molding compositions of this type for producing fibers, foils and moldings, and to the resultant moldings, fibers, and foils of any type.

Addition of red phosphorus to thermoplastics, especially to reinforced or filled polyamides, is known to lead to effective fire protection (DE-A-1931387). However, under unfavorable conditions, e.g. elevated temperature or moisture, or presence of alkali or oxygen, red phosphorus tends to form decomposition products, such as phosphine and acids of mono- to pentavalent phosphorus. Although red phosphorus incorporated within thermoplastics, e.g. within polyamides, has substantial protection from thermaloxidation as a consequence of embedment into the polymer, formation of decomposition products can nevertheless still occur here over prolonged periods. This is disadvantageous because if pellets are not correctly processed in the injection-molding process, the resultant phosphine can cause odor problems and is moreover toxic. The phosphorus acids produced at the same time can deposit on the surface of moldings, a particular result being that the moldings have reduced tracking resistance. There has therefore been no lack of attempts to improve the stability of red phosphorus used as flame retardant for plastics. By way of example, a stabilizing effect can be achieved via addition of oxides or hydroxides of zinc, of magnesium, or of copper. In DE-A-2625691, in addition to said stabilization via metal oxides, a polymer is used to coat the phosphorus particles. However, said coating or encapsulation process is very complicated, and the stabilizing effect of the system is moreover not always satisfactory.

WO 2011/023584 discloses mixtures of silver and zinc oxide which are used as antifouling additive for polysulfone membranes.

The present invention was therefore based on the object of providing thermoplastic molding compositions which comprise red phosphorus with effective stabilization as flame retardant, i.e. exhibit less phosphorus acid deposition, and also less phosphine formation. The stabilizers are moreover intended to feature good stability during processing and particularly homogeneous processability in the plastics melt.

The molding compositions defined in the introduction have accordingly been discovered. Preferable embodiments can be found in the dependent claims.

The molding compositions of the invention comprise, as component A), from 10 to 99.8% by weight, preferably from 20 to 98% by weight, and in particular from 30 to 90% by weight, of at least one polyamide.

The polyamides of the molding compositions of the invention generally have an intrinsic viscosity of from 90 to 350 ml/g, preferably from 110 to 240 ml/g, determined in a 0.5% strength by weight solution in 96% strength by weight sulfuric acid at 25° C. to ISO 307.

Preference is given to semicrystalline or amorphous resins with a molecular weight (weight average) of at least 5000, described by way of example in the following U.S. Pat. Nos. 2,071,250, 2,071,251, 2,130,523, 2,130,948, 2,241,322, 2,312,966, 2,512,606, and 3,393,210.

Examples of these are polyamides that derive from lactams having from 7 to 13 ring members, e.g. polycaprolactam, polycaprylolactam, and polylaurolactam, and also polyamides obtained via reaction of dicarboxylic acids with diamines.

Dicarboxylic acids which may be used are alkanedicarboxylic acids having 6 to 12, in particular 6 to 10, carbon atoms, and aromatic dicarboxylic acids. Merely as examples, acids that may be mentioned here are adipic acid, azelaic acid, sebacic acid, dodecanedioic acid and terephthalic and/or isophthalic acid.

Particularly suitable diamines are alkanediamines having from 6 to 12, in particular from 6 to 8, carbon atoms, and also m-xylylenediamine (e.g. Ultramid® X17 from BASF SE, where the molar ratio of MXDA to adipic acid is 1:1), di(4-aminophenyl)methane, di(4-aminocyclohexyl)-methane, 2,2-di(4-aminophenyl)propane, 2,2-di(4-aminocyclohexyl) propane, and 1,5-diamino-2-methylpentane.

Preferred polyamides are polyhexamethyleneadipamide, polyhexamethylenesebacamide, and polycaprolactam, and also nylon-6/6,6 copolyamides, in particular having a proportion of from 5 to 95% by weight of caprolactam units (e.g. Ultramid® C31 from BASF SE).

Other suitable polyamides are obtainable from ω-aminoalkylnitriles, e.g. aminocapronitrile (PA 6) and adiponitrile with hexamethylenediamine (PA 66) via what is known as direct polymerization in the presence of water, for example as described in DE-A 10313681, EP-A 1198491 and EP 922065.

Mention may also be made of polyamides obtainable, by way of example, via condensation of 1,4-diaminobutane with adipic acid at an elevated temperature (nylon-4,6). Preparation processes for polyamides of this structure are described by way of example in EP-A 38 094, EP-A 38 582, and EP-A 39 524.

Other suitable examples are polyamides obtainable via copolymerization of two or more of the abovementioned monomers, and mixtures of two or more polyamides in any desired mixing ratio. Particular preference is given to mixtures of nylon-6,6 with other polyamides, in particular nylon-6/6,6 copolyamides.

Other copolyamides which have proven particularly advantageous are semiaromatic copolyamides, such as PA 6/6T and PA 66/6T, where the triamine content of these is less than 0.5% by weight, preferably less than 0.3% by weight (see EP-A 299 444). Other polyamides resistant to high temperatures are known from EP-A 19 94 075 (PA 6T/6I/MX06).

The processes described in EP-A 129 195 and 129 196 can be used to prepare the preferred semiaromatic copolyamides with low triamine content.

The following list, which is not comprehensive, comprises the polyamides A) mentioned and other polyamides A) for the purposes of the invention, and the monomers comprised:
AB Polymers:
PA 4 Pyrrolidone
PA 6 ε-Caprolactam
PA 7 Ethanolactam
PA 8 Caprylolactam PA 9 9-Aminopelargonic acid
PA 11 11-Aminoundecanoic acid
PA 12 Laurolactam
AA/BB Polymers:
PA 46 Tetramethylenediamine, adipic acid
PA 66 Hexamethylenediamine, adipic acid
PA 69 Hexamethylenediamine, azelaic acid
PA 610 Hexamethylenediamine, sebacic acid
PA 612 Hexamethylenediamine, decanedicarboxylic acid
PA 613 Hexamethylenediamine, undecanedicarboxylic acid
PA 1212 1,12-Dodecanediamine, decanedicarboxylic acid
PA 1313 1,13-Diaminotridecane, undecanedicarboxylic acid
PA 6T Hexamethylenediamine, terephthalic acid
PA 9T 1,9-Nonanediamine, terephthalic acid
PA MXD6 m-Xylylenediamine, adipic acid
AA/BB Polymers:
PA 6I Hexamethylenediamine, isophthalic acid
PA 6-3-T Trimethylhexamethylenediamine, terephthalic acid
PA 6/6T (see PA 6 and PA 6T)
PA 6/66 (see PA 6 and PA 66)
PA 6/12 (see PA 6 and PA 12)
PA 66/6/610 (see PA 66, PA 6 and PA 610)
PA 6I/6T (see PA 61 and PA 6T)
PA PACM 12 Diaminodicyclohexylmethane, laurolactam
PA 6I/6T/PACM as PA 6I/6T+diaminodicyclohexylmethane
PA 12/MACMI Laurolactam, dimethyldiaminodicyclohexylmethane, isophthalic acid
PA 12/MACMT Laurolactam, dimethyldiaminodicyclohexylmethane, terephthalic acid
PA PDA-T Phenylenediamine, terephthalic acid Preferred flame retardant B) is elemental red phosphorus, in particular in combination with glassfiber-reinforced molding compositions; it can be used in untreated form.

However, particularly suitable preparations are those in which the phosphorus has been surface-treated with low-molecular-weight liquid substances, such as silicone oil, paraffin oil, or esters of phthalic acid (in particular dioctyl phthalate, see EP 176 836) or adipic acid, or with polymeric or oligomeric compounds, e.g. with phenolic resins or aminoplastics, or else with polyurethanes (see EP-A 384 232, DE-A 196 48 503). Amounts comprised of the these "phlegmatizing agents" are generally from 0.05 to 5% by weight, based on 100% by weight of B).

Concentrates of red phosphorus are also suitable as flame retardant, e.g. in a polyamide or elastomer. Particularly suitable concentrate polymers are polyolefin homopolymers and polyolefin copolymers. However, the proportion of the concentrate polymer—if no polyamide is used as thermoplastic—should not exceed 35% by weight, based on the weight of components A) and B) in the molding compositions of the invention.

Preferred concentrate compositions are
$B_1$) from 30 to 90% by weight, preferably from 45 to 70% by weight, of a polyamide or elastomer, and
$B_2$) from 10 to 70% by weight, preferably from 30 to 55% by weight, of red phosphorus.

The polyamide used for the masterbatch can differ from A) or can preferably be identical with A), in order that no adverse effect on the molding composition results from any incompatibility or melting-point differences.

The average particle size ($d_{50}$) of the phosphorus particles dispersed in the molding compositions is preferably in the range from 0.0001 to 0.5 mm; in particular from 0.001 to 0.2 mm.

The content of component B) in the molding compositions of the invention is from 0.1 to 60% by weight, preferably from 0.5 to 40% by weight, and in particular from 1 to 15% by weight, based on the entirety of components A) to E).

The molding compositions of the invention comprise, as component C), from 0.05 to 20% by weight, preferably from 0.05 to 5% by weight, and in particular from 0.1 to 2% by weight, of a stabilizer mixture C) composed of, based on 100% by weight,
$C_1$) from 10.1 to 99.9% by weight of elemental Ag and
$C_2$) from 0.1 to 89.9% by weight of ZnO.
Preferred mixtures C) comprise
$C_1$) from 20.1 to 99.9% by weight, in particular from 20.1 to 40% by weight, of elemental silver and
$C_2$) from 79.9 to 0.1% by weight, in particular from 79.9 to 60% by weight, of ZnO.

The entirety of $C_1$) and $C_2$) in the preferred mixtures should—as a result of the production process (as described below)—account for at least 90% of the mixture, preferably at least 95% of the mixture, and in particular 100% of the mixture.

The remaining constituents of the mixtures C) can be composed of, by way of example, unreacted carbonates or oxides.

The primary particle size of the fine-particle elemental silver $C_1$) is preferably from 10 to 200 nm, in particular from 10 to 100 nm, very particularly preferably from 30 to 80 nm.

The primary particle size of the fine-particle ZnO $C_2$) is preferably from 0.1 to 50 μm, in particular from 0.1 to 22 μm, and very particularly preferably from 1 to 22 μm.

The preferred particle size distribution of C) is from 1 to 30 μm, in particular from 1 to 22 μm.

The specific surface area, i.e. BET surface area, of the mixture C) is preferably from 10 to 80 m$^2$/g, in particular from 15 to 45 m$^2$/g.

The abovementioned parameters such as primary particle size are determined in the invention by SEM (Scanning Electron Microscope). Additional information concerning the elemental constitution of the primary particles (nm scale) can be obtained if a combined method is used, involving what is known as EXD (Energy Dispersive X-ray Spectroscopy).

The particle size distribution can also be determined by means of laser granulometry (laser diffraction method). Preferred measurement method: dispersion in water with addition of acrylate-based dispersing agents and treatment of the dispersion with ultrasound.

BET surface area is generally determined (under nitrogen) to ISO 9277.

The mixture C) of the invention can be obtained by
i) mixing a 1st mixture made of at least one silver salt with a 2nd mixture made of at least one Zn salt and thus obtaining a 3rd mixture made of Zn+Ag salts,
ii) admixing a carbonate source with said 3rd mixture,
iii) precipitating the resultant Ag and Zn carbonates together, and
iv) then washing, and
v) subjecting the Ag carbonates and Zn carbonates together to thermal decomposition.

Further details, for example Ag and Zn salts that can be used, and also carbonate sources, and production conditions, such as solvents, temperature, etc., can be found in WO 2011/023584, which is expressly incorporated herein by way of reference.

The molding compositions comprise, as component D), amounts of from 0 to 40% by weight, preferably from 1 to 30% by weight, in particular from 2 to 20% by weight, of elastomeric polymers (often also termed impact modifiers, elastomers, or rubbers).

These are very generally copolymers preferably composed of at least two of the following monomers: ethylene, propylene, butadiene, isobutene, isoprene, chloroprene, vinyl acetate, styrene, acrylonitrile and acrylates and/or methacrylates having from 1 to 18 carbon atoms in the alcohol component.

Polymers of this type are described, for example, in Houben-Weyl, Methoden der organischen Chemie, Vol. 14/1 (Georg-Thieme-Verlag, Stuttgart, Germany, 1961), pages 392-406, and in the monograph by C. B. Bucknall, "Toughened Plastics" (Applied Science Publishers, London, UK, 1977).

Some preferred types of such elastomers are described below.

Preferred types of such elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2,6}$]-3,8-decadiene, and mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM rubbers and EPDM rubbers may preferably also have been grafted with reactive carboxylic acids or with derivatives of these. Examples of these are acrylic acid, methacrylic acid and derivatives thereof, e.g. glycidyl (meth)acrylate, and also maleic anhydride.

Copolymers of ethylene with acrylic acid and/or methacrylic acid and/or with the esters of these acids are another group of preferred rubbers. The rubbers may also comprise dicarboxylic acids, such as maleic acid and fumaric acid, or derivatives of these acids, e.g. esters and anhydrides, and/or monomers comprising epoxy groups. These monomers comprising dicarboxylic acid derivatives or comprising epoxy groups are preferably incorporated into the rubber by adding to the monomer mixture monomers comprising dicarboxylic acid groups and/or epoxy groups and having the general formulae I or II or III or IV

(I)

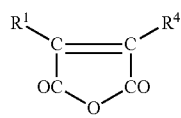
(II)

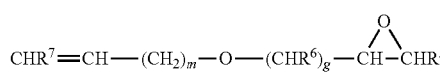
(III)

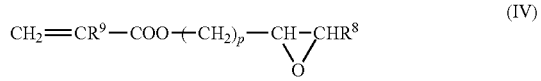
(IV)

where $R^1$ to $R^9$ are hydrogen or alkyl groups having from 1 to 6 carbon atoms, and m is a whole number from 0 to 20, g is a whole number from 0 to 10 and p is a whole number from 0 to 5.

The radicals $R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates comprising epoxy groups, such as glycidyl acrylate and glycidyl methacrylate, and the esters with tertiary alcohols, such as tert-butyl acrylate. Although the latter have no free carboxy groups, their behavior approximates to that of the free acids and they are therefore termed monomers with latent carboxy groups.

The copolymers are advantageously composed of from 50 to 98% by weight of ethylene, from 0.1 to 20% by weight of monomers comprising epoxy groups and/or methacrylic acid and/or monomers comprising anhydride groups, the remaining amount being (meth)acrylates.

Particular preference is given to copolymers composed of from 50 to 98% by weight, in particular from 55 to 95% by weight, of ethylene, from 0.1 to 40% by weight, in particular from 0.3 to 20% by weight, of glycidyl acrylate and/or glycidyl methacrylate, (meth)acrylic acid and/or maleic anhydride, and from 1 to 45% by weight, in particular from 5 to 40% by weight, of n-butyl acrylate and/or 2-ethylhexyl acrylate.

Other preferred (meth)acrylates are the methyl, ethyl, propyl, isobutyl and tert-butyl esters.

Comonomers which may be used alongside these are vinyl esters and vinyl ethers.

The ethylene copolymers described above may be prepared by processes known per se, preferably by random copolymerization at high pressure and elevated temperature. Appropriate processes are well-known.

Other preferred elastomers are emulsion polymers whose preparation is described, for example, by Blackley in the monograph "Emulsion Polymerization". The emulsifiers and catalysts which can be used are known per se.

In principle it is possible to use homogeneously structured elastomers or else those with a shell structure. The shell-type structure is determined by the sequence of addition of the individual monomers. The morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, corresponding methacrylates, butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell composed of a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers.

It has proven advantageous in some cases to use emulsion polymers which have reactive groups at their surfaces. Examples of groups of this type are epoxy, carboxy, latent carboxy, amino and amide groups, and also functional groups which may be introduced by concomitant use of monomers of the general formula

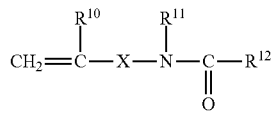

where the substituents can be defined as follows:
$R^{10}$ is hydrogen or a $C_1$-$C_4$-alkyl group,
$R^{11}$ is hydrogen, a $C_1$-$C_8$-alkyl group or an aryl group, in particular phenyl,
$R^{12}$ is hydrogen, a $C_1$-$C_{10}$-alkyl group, a $C_6$-$C_{12}$-aryl group, or —$OR^{13}$,
$R^{13}$ is a $C_1$-$C_8$-alkyl group or a $C_6$-$C_{12}$-aryl group, which can optionally have substitution by groups that comprise O or by groups that comprise N,
X is a chemical bond, a $C_1$-$C_{10}$-alkylene group, or a $C_6$-$C_{12}$-arylene group, or

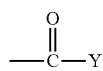

Y is O—Z or NH—Z, and
Z is a $C_1$-$C_{10}$-alkylene or $C_6$-$C_{12}$-arylene group.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers comprising allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention may first be made here of graft polymers with a core and with at least one outer shell, and having the following structure:

| Type | Monomers for the core | Monomers for the envelope |
|---|---|---|
| I | 1,3-butadiene, isoprene, n-butyl acrylate, ethylhexyl acrylate, or a mixture of these | styrene, acrylonitrile, methyl methacrylate |
| II | as I, but with concomitant use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but with concomitant use of monomers having reactive groups, as described herein |
| V | styrene, acrylonitrile, methyl methacrylate, or a mixture of these | first envelope composed of monomers as described under I and II for the core, second envelope as described under I or IV for the envelope |

Instead of graft polymers whose structure has more than one shell, it is also possible to use homogeneous, i.e. single-shell, elastomers composed of 1,3-butadiene, isoprene and n-butyl acrylate or of copolymers of these. These products, too, may be prepared by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core composed of n-butyl acrylate or based on butadiene and with an outer envelope composed of the abovementioned copolymers, and copolymers of ethylene with comonomers which supply reactive groups.

The elastomers described may also be prepared by other conventional processes, e.g. by suspension polymerization.

Preference is also given to silicone rubbers, as described in DE-A 37 25 576, EP-A 235 690, DE-A 38 00 603 and EP-A 319 290.

Particularly preferred rubbers D) are ethylene copolymers, as described above, which comprise functional monomers, where the functional monomers have been selected from the group of the carboxylic acid, anhydride, carboxylic ester, carboxamide, carboximide, amino, hydroxy, epoxy, urethane, and oxazoline groups, and mixtures of these.

The proportion of the functional groups is from 0.1 to 20% by weight, preferably from 0.2 to 10% by weight, and in particular from 0.3 to 3.5% by weight, based on 100% by weight of D).

Particularly preferred monomers are composed of an ethylenically unsaturated mono- or dicarboxylic acid or of a functional derivative of this type of acid.

In principle any of the primary, secondary, and tertiary $C_1$-$C_{18}$-alkyl esters of acrylic acid or methacrylic acid is suitable, but preference is given to esters having from 1 to 12 carbon atoms, in particular having from 2 to 10 carbon atoms.

Examples of these are methyl, ethyl, propyl, n-butyl, isobutyl, and tert-butyl, 2-ethylhexyl, octyl, and decyl acrylates and the corresponding methacrylates. Among these, particular preference is given to n-butyl acrylate and 2-ethylhexyl acrylate.

Instead of the esters or in addition to these, it is also possible that the olefin polymers comprise acid-functional and/or latent acid-functional monomers of ethylenically unsaturated mono- or dicarboxylic acids, or comprise monomers having epoxy groups.

Other examples that may be mentioned of monomers are acrylic acid, methacrylic acid, tertiary alkyl esters of said acids, in particular tert-butyl acrylate, and dicarboxylic acids, such as maleic acid and fumaric acid, and derivatives of said acids, and also monoesters of these.

Latent acid-functional monomers are compounds which form free acid groups under the polymerization conditions and, respectively, during incorporation of the olefin polymers into the molding compositions. Examples of these that may be mentioned are anhydrides of dicarboxylic acids having up to 20 carbon atoms, in particular maleic anhydride, and tertiary $C_1$-$C_{12}$-alkyl esters of the abovementioned acids, in particular tert-butyl acrylate and tert-butyl methacrylate.

The acid-functional or latent acid-functional monomers and the monomers comprising epoxy groups are preferably incorporated into the olefin polymers via addition of compounds of the general formulae I-IV to the monomer mixture.

The melt index of the ethylene copolymers is generally in the range from 1 to 80 g/10 min (measured at 190° C. with 2.16 kg load).

The molar mass of said ethylene-α-olefin copolymers is from 10 000 to 500 000 g/mol, preferably from 15 000 to 400 000 g/mol (Mn, determined by means of GPC in 1,2,4-trichlorobenzene with PS calibration).

In one particular embodiment, ethylene-α-olefin copolymers are used which have been produced by means of what are known as "single site catalysts". Further details can be found in U.S. Pat. No. 5,272,236. In this case, the molecular weight distribution of the ethylene-α-olefin copolymers is narrow for polyolefins, being smaller than 4, preferably smaller than 3.5.

Preferred commercially available products used are Exxelor® VA 1801 or 1803, Kraton® G 1901 FX or Fusabond® N NM493 D or Fusabond® A560 from Exxon, Kraton and DuPont, and also Tafmer® MH 7010 from Mitsui.

It is also possible, of course, to use mixtures of the types of rubber listed above.

The molding compositions of the invention can comprise, as component E), up to 60% by weight, preferably up to 50% by weight, of further additives.

Fibrous or particulate fillers E) that may be mentioned are carbon fibers, glass fibers, glass beads, amorphous silica, calcium silicate, calcium metasilicate, magnesium carbonate, kaolin, chalk, powdered quartz, mica, barium sulfate, and feldspar, and the amounts of these that can be used are from 1 to 50% by weight, in particular from 1 to 40% by weight, preferably from 10 to 40% by weight.

Preferred fibrous fillers that may be mentioned are carbon fibers, aramid fibers, and potassium titanate fibers, particular preference being given to glass fibers in the form of E glass. These can be used as rovings or in the commercially available forms of chopped glass.

The fibrous fillers may have been surface-pretreated with a silane compound to improve compatibility with the thermoplastic.

Suitable silane compounds have the general formula

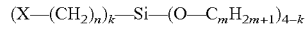

where the definitions of the substituents are as follows:
X is $NH_2$—,

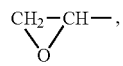

HO—,
n is a whole number from 2 to 10, preferably 3 to 4,
m is a whole number from 1 to 5, preferably 1 to 2, and
k is a whole number from 1 to 3, preferably 1.

Preferred silane compounds are aminopropyltrimethoxysilane, aminobutyltrimethoxysilane, aminopropyltriethoxysilane and aminobutyltriethoxysilane, and also the corresponding silanes which comprise a glycidyl group as substituent X.

The amounts of the silane compounds generally used for surface-coating are from 0.01 to 2% by weight, preferably from 0.025 to 1.0% by weight and in particular from 0.05 to 0.5% by weight (based on E)).

Acicular mineral fillers are also suitable.

For the purposes of the invention, acicular mineral fillers are mineral fillers with strongly developed acicular character. An example is acicular wollastonite. The mineral preferably has an L/D (length to diameter) ratio of from 8:1 to 35:1, preferably from 8:1 to 11:1. The mineral filler may, if appropriate, have been pretreated with the abovementioned silane compounds, but the pretreatment is not essential.

Other fillers which may be mentioned are kaolin, calcined kaolin, wollastonite, talc and chalk, and also lamellar or acicular nanofillers, the amounts of these preferably being from 0.1 to 10%. Materials preferred for this purpose are boehmite, bentonite, montmorillonite, vermiculite, hectorite, and laponite. The lamellar nanofillers are organically modified by prior-art methods, to give them good compatibility with the organic binder. Addition of the lamellar or acicular nanofillers to the inventive nanocomposites gives a further increase in mechanical strength.

The molding compositions of the invention can comprise, as component E), from 0.05 to 3% by weight, preferably from 0.1 to 1.5% by weight, and in particular from 0.1 to 1% by weight, of a lubricant.

Preference is given to the salts of Al, of alkali metals, or of alkaline earth metals, or esters or amides of fatty acids having from 10 to 44 carbon atoms, preferably having from 12 to 44 carbon atoms.

The metal ions are preferably alkaline earth metal and Al, particular preference being given to Ca or Mg.

Preferred metal salts are Ca stearate and Ca montanate, and also Al stearate.

It is also possible to use a mixture of various salts, in any desired mixing ratio.

The carboxylic acids can be monobasic or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols can be monohydric to tetrahydric. Examples of alcohols are n-butanol, n-octanol, stearyl alcohol, ethylene glycol, propylene glycol, neopentyl glycol, pentaerythritol, preference being given to glycerol and pentaerythritol.

The aliphatic amines can be monobasic to tribasic. Examples of these are stearylamine, ethylenediamine, propylenediamine, hexamethylenediamine, di(6-aminohexyl)amine, particular preference being given to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use a mixture of various esters or amides, or of esters with amides in combination, in any desired mixing ratio.

The molding compositions of the invention can comprise, as component E), from 0.05 to 3% by weight, preferably from 0.1 to 1.5% by weight, and in particular from 0.1 to 1% by weight, of a copper stabilizer, preferably of a Cu(I) halide, in particular in a mixture with an alkali metal halide, preferably KI, in particular in the ratio 1:4, or of a sterically hindered phenol, or a mixture of these.

Preferred salts of monovalent copper used are copper (I) acetate, copper (I) chloride, copper (I) bromide, and copper (I) iodide. The materials comprise these in amounts of from 5 to 500 ppm of copper, preferably from 10 to 250 ppm, based on polyamide.

The advantageous properties are in particular obtained if the copper is present with molecular distribution in the polyamide. This is achieved if a concentrate comprising the polyamide, and comprising a salt of monovalent copper, and comprising an alkali metal halide, in the form of a solid, homogeneous solution is added to the molding composition. By way of example, a typical concentrate is composed of from 79 to 95% by weight of polyamide and from 21 to 5% by weight of a mixture composed of copper iodide or copper bromide and potassium iodide. The copper concentration in the solid homogeneous solution is preferably from 0.3 to 3% by weight, in particular from 0.5 to 2% by weight, based on the total weight of the solution, and the molar ratio of copper (I) iodide to potassium iodide is from 1 to 11.5, preferably from 1 to 5.

Suitable polyamides for the concentrate are homopolyamides and copolyamides, in particular nylon-6 and nylon-6,6.

Suitable sterically hindered phenols E) are in principle all of the compounds which have a phenolic structure and which have at least one bulky group on the phenolic ring.

It is preferable to use, for example, compounds of the formula

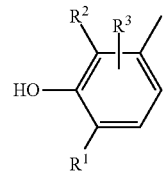

where:

$R^1$ and $R^2$ are an alkyl group, a substituted alkyl group, or a substituted triazole group, and where the radicals $R^1$ and $R^2$ may be identical or different, and $R^3$ is an alkyl group, a substituted alkyl group, an alkoxy group, or a substituted amino group.

Antioxidants of the abovementioned type are described by way of example in DE-A 27 02 661 (U.S. Pat. No. 4,360,617).

Another group of preferred sterically hindered phenols is provided by those derived from substituted benzenecarboxylic acids, in particular from substituted benzenepropionic acids.

Particularly preferred compounds from this class are compounds of the formula

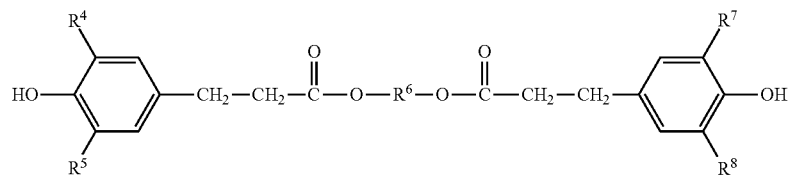

where $R^4$, $R^5$, $R^7$, and $R^8$, independently of one another, are $C_1$-$C_8$-alkyl groups which themselves may have substitution (at least one of these being a bulky group), and $R^6$ is a divalent aliphatic radical which has from 1 to 10 carbon atoms and whose main chain may also have C—O bonds.

Preferred compounds corresponding to this formula are

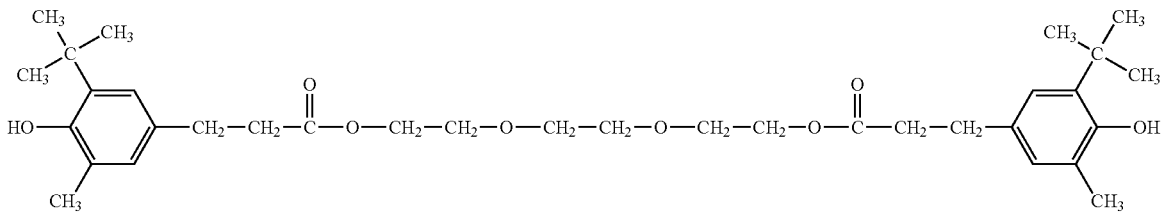

(Irganox® 245 from BASF SE)

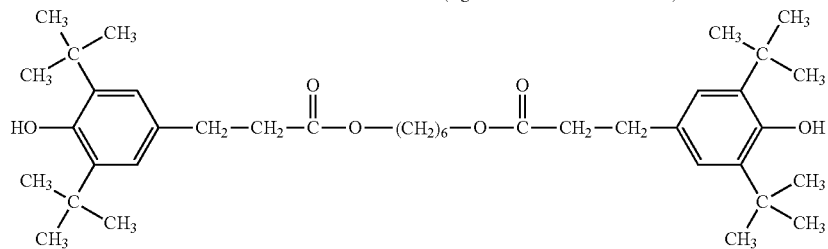

(Irganox® 245 from BASF SE)

All of the following should be mentioned as examples of sterically hindered phenols:

2,2'-methylenebis(4-methyl-6-tert-butylphenol), 1,6-hexanediol bis[3-(3,5-di-tert-butyl-4-hydroxyphenyl)propionate], pentaerythrityl tetrakis[3-(3,5-di-tert-butyl-4-hydroxyphenyl)-propionate], distearyl 3,5-di-tert-butyl-4-hydroxybenzylphosphonate, 2,6,7-trioxa-1-phosphabicyclo[2.2.2]oct-4-ylmethyl 3,5-di-tert-butyl-4-hydroxyhydrocinnamate, 3,5-di-tert-butyl-4-hydroxyphenyl-3,5-distearylthiotriazylamine, 2-(2'-hydroxy-3'-hydroxy-3',5'-di-tert-butylphenyl)-5-chlorobenzotriazole, 2,6-di-tert-butyl-4-hydroxymethylphenol, 1,3,5-trimethyl-2,4,6-tris(3,5-di-tert-butyl-4-hydroxybenzyl)benzene, 4,4'-methylenebis(2,6-di-tert-butylphenol), 3,5-di-tert-butyl-4-hydroxybenzyldimethylamine.

Compounds which have proven particularly effective and which are therefore used with preference are 2,2'-methylenebis(4-methyl-6-tert-butylphenol), 1,6-hexanediol bis(3,5-di-tert-butyl-4-hydroxyphenyl)propionate (Irganox® 259), pentaerythrityl tetrakis[3-(3,5-di-tert-butyl-4-hydroxyphenyl)propionate], and also N,N'-hexamethylenebis-3,5-di-tert-butyl-4-hydroxyhydrocinnamide (Irganox® 1098), and the product Irganox® 245 described above from BASF SE, which has particularly good suitability.

The amount comprised of the antioxidants E), which can be used individually or as a mixture, is from 0.05 up to 3% by weight, preferably from 0.1 to 1.5% by weight, in particular from 0.1 to 1% by weight, based on the total weight of the molding compositions A) to E).

In some instances, sterically hindered phenols having not more than one sterically hindered group in ortho-position with respect to the phenolic hydroxy group have proven particularly advantageous; in particular when assessing colorfastness on storage in diffuse light over prolonged periods.

The molding compositions of the invention can comprise, as component E), from 0.05 to 5% by weight, preferably from 0.1 to 2% by weight, and in particular from 0.25 to 1% by weight, of a nigrosin.

Nigrosins are generally a group of black or gray phenazine dyes (azine dyes) related to the indulines and taking various forms (water-soluble, oleosoluble, spirit-soluble), used in wool dyeing and wool printing, in black dyeing of silks, and in the coloring of leather, of shoe creams, of varnishes, of plastics, of stoving lacquers, of inks, and the like, and also as microscopy dyes.

Nigrosins are obtained industrially via heating of nitrobenzene, aniline, and aniline hydrochloride with metallic iron and $FeCl_3$ (the name being derived from the Latin niger=black).

Component E) can be used in the form of free base or else in the form of salt (e.g. hydrochloride).

Further details concerning nigrosins can be found by way of example in the electronic encyclopedia Römpp Online, Version 2.8, Thieme-Verlag Stuttgart, 2006, keyword "Nigrosin".

The thermoplastic molding compositions of the invention can comprise, as component E), conventional processing aids, such as stabilizers, oxidation retarders, agents to counteract decomposition by heat and decomposition by ultraviolet light, lubricants and mold-release agents, colorants, such as dyes and pigments, nucleating agents, plasticizers, etc.

Examples of oxidation retarders and heat stabilizers are sterically hindered phenols and/or phosphites and amines (e.g. TAD), hydroquinones, aromatic secondary amines, such as diphenylamines, various substituted members of these groups, and mixtures of these, in concentrations of up to 1% by weight, based on the weight of the thermoplastic molding compositions.

UV stabilizers that may be mentioned, the amounts of which used are generally up to 2% by weight, based on the molding composition, are various substituted resorcinols, salicylates, benzotriazoles, and benzophenones.

Materials that can be added as colorants are inorganic pigments, such as titanium dioxide, ultramarine blue, iron oxide, and carbon black, and also organic pigments, such as phthalocyanines, quinacridones, perylenes, and also dyes, such as anthraquinones.

Materials that can be used as nucleating agents are sodium phenylphosphinate, aluminum oxide, silicon dioxide, and also preferably talc powder.

The thermoplastic molding compositions of the invention can be produced by processes known per se, by mixing the starting components in conventional mixing apparatus, such as screw-based extruders, Brabender mixers, or Banbury mixers, and then extruding the same. The extrudate can be cooled and pelletized. It is also possible to premix individual components and then to add the remaining starting materials individually and/or likewise in the form of a mixture. The mixing temperatures are generally from 230 to 320° C.

In another preferred mode of operation, components B) to C) and also, if appropriate, D) and E) can be mixed with a prepolymer, compounded, and pelletized. The resultant pellets are then solid-phase condensed under an inert gas continuously or batchwise at a temperature below the melting point of component A) until the desired viscosity has been reached.

The thermoplastic molding compositions of the invention feature good flame retardancy and excellent phosphorus stability. These materials are therefore suitable for producing fibers, foils, and moldings of any type. Some examples are mentioned hereinafter: plug connectors, plugs, plug parts, cable harness components, circuit mounts, circuit mount components, three-dimensionally injection-molded circuit mounts, electrical connector elements, and mechatronic components.

The moldings or semifinished products to be produced in the invention from the thermoplastic molding compositions can be used by way of example in the motor vehicle industry, electrical industry, electronics industry, telecommunications industry, information technology industry, entertainment industry, or computer industry, in vehicles and other conveyances, in ships, in spacecraft, in households, in office equipment, in sports, in medicine, and also generally in articles and parts of buildings which require increased fire protection.

Improved-flow polyamides can be used in the kitchen and household sector for producing components for kitchen equipment, e.g. fires, smoothing irons, buttons, and also for garden- and leisure-sector applications.

EXAMPLES

The following components were used:
Component A:
Nylon-6,6 with intrinsic viscosity IV 150 mL/g, measured in 0.5% by weight solution in 96% by weight sulfuric acid at 25° C. to ISO 307 (using Ultramid A27 from BASF SE).
Component B:
50% concentrate of red phosphorus of average particle size ($d_{50}$) from 10 to 30 μm in an olefin polymer made of: 59.8% by weight of ethylene, 35% by weight of n-butyl acrylate, 4.5% by weight of acrylic acid, and 0.7% by weight of maleic anhydride (component D) with melt index MFI (190/2.16) 10 g/10 min. The copolymer was produced via copolymerization of the monomers at elevated temperature and elevated pressure.

Component C/1: commercially available zinc oxide (for comparison).

Component C/2: silver-zinc oxide mixture of the invention (obtainable as in WO 2011/023584):

Component C/2 was produced via coprecipitation of the carbonates and subsequent heating in a muffle furnace:

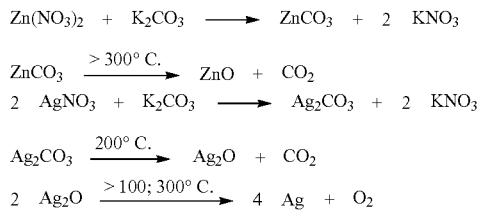

Zinc nitrate (59.5 g; 0.20 mol) and silver nitrate (6.4 g; 0.04 mol) were dissolved in 100 ml of deionized water. The solution was then added dropwise within a period of 30 min. at 50° C. to a stirred (at 8000 rpm by means of an Ultra-Turrax T25) solution of potassium carbonate (34.8 g; 0.22 mol) in 300 ml of water, and stirring was continued for 30 min. Aluminum foil was used to protect the charge from light. The yellow suspension was suction-filtered (Whatman® type 1 filter, porosity 11 μm, 88 g/m², thickness 0.18 mm, ash value 0.06%), and washed twice with water to give a residual nitrate content smaller than 10 ppm (200 ml of water/10 g of solid). The filter cake was again taken up in ethanol and in turn dried by suction. The filter cake was then dried (40 min.) at 200° C. in the muffle furnace, and calcined for 90 min. at 350° C. Thermogravimetric process control was used here. 3 degradation stages were apparent at 155° C., 237° C., and 350° C. (heating rate: 20° K/min). The product was 30.1 g of a brown powder with 39% silver content.

Ag particle size via EDX: 100 nm±15 nm
ZnO particle size via EDX: <20 μm
Particle size distribution via laser granulometry: 2.8 μm ($d_{50}$ value)
BET surface area [m²/g]: 19.5

Primary particle size was determined by means of energy-dispersive X-ray spectroscopy (SEM/EDX); the particle size distribution is determined via laser granulometry (Mastersizer ex Malvern).

Component E/1:
Standard chopped glass fiber for polyamides, length=4.5 mm, diameter=10 μm.

Component E/2:
N,N'-Hexamethylenebis-3,5-di-tert-butyl-4-hydroxyhydrocinnamide (Irganox® 1098)

Component E/3:
Ca Stearate

In order to provide evidence of the phosphorus stability improvements described in the invention, appropriate plastics molding compositions were manufactured via compounding. To this end, the individual components were mixed in a ZSK 26 (Berstorff) twin-screw extruder with throughput 20 kg/h and a flat temperature profile at about 270° C., extruded in the form of strand, cooled until pelletizable, and pelletized.

The test specimens for the study set out in Table 1 were injection-molded in an Arburg 420C injection-molding machine at a melt temperature of about 270° C. and mold temperature of about 80° C.

Testing of Plastics Parts for Phosphorus Deposition:

A plastics specimen (125×12.5×1.6 mm) was halved, and each half was placed in a 10 ml glass beaker. A silver contact material (10×50×0.125 mm) was placed in a short test tube. The three specimens were then placed in a 100 ml screw-cap bottle, 5 ml of water was added, and the sealed system was placed in a drying oven at 70° C. After 28 days, the test tube was removed and filled to the top with water, and the entire contents were placed in a glass beaker. 5 ml of conc. hydrochloric acid were added to this, and the mixture was evaporated almost to dryness. The metal specimen was then removed and rinsed with water; 1 ml of sulfuric acid was admixed with the residue, and the mixture was again evaporated almost to dryness. 20 ml of water is then used for dilution, 4 ml of 5% potassium peroxodisulfate solution are added, and the mixture is heated for 30 minutes. Phosphorus was then determined photometrically by using molybdenum blue, in μg of phosphorus/plastics specimen.

The table gives the constitutions of the molding compositions and the results of the measurements.

TABLE

| Components [% by wt.] | Comparative example | Inventive example |
|---|---|---|
| A | 61.6 | 61.8 |
| B + D | 12 | 12 |
| E/1 | 25 | 25 |
| C/1 | 0.7 | — |
| C/2 | — | 0.5 |
| E/2 + E/3 (50:50) | 0.7 | 0.7 |
| Phosphorus deposition after 28 days/70° C. in μg of phosphorus/specimen | 150 | 19 |

The invention claimed is:

1. A thermoplastic molding composition comprising
   A) from 10 to 99.8% by weight of a thermoplastic polyamide,
   B) from 0.1 to 60% by weight of red phosphorus,
   C) from 0.05 to 20% by weight of a stabilizer mixture C) composed of, based on 100% of C),
      $C_1$) from 10.1 to 99.9% by weight of elemental Ag and
      $C_2$) from 0.1 to 89.9% by weight of ZnO,
      wherein component C) is obtained by
      i) mixing a 1st mixture made of at least one silver salt with a 2nd mixture made of at least one Zn salt and thus obtaining a 3rd mixture made of Zn+Ag salts;
      ii) admixing a carbonate source with said 3rd mixture;
      iii) precipitating the resultant Ag and Zn carbonates together;
      iv) then washing; and
      v) subjecting the Ag carbonates and Zn carbonates together to thermal decomposition;
   D) from 0 to 40% by weight of an impact modifier, and
   E) from 0 to 60% by weight of further additives,
   where the sum of the percentages by weight of A) to E) do not exceed 100%.

2. The thermoplastic molding composition according to claim 1, comprising
   A) from 20 to 98% by weight,
   B) from 0.5 to 40% by weight,
   C) from 0.05 to 20% by weight,
   D) from 1 to 30% by weight and
   E) from 0 to 50% by weight.

3. The thermoplastic molding composition according to claim 1, in which the primary particle size of component $C_1$) measured by SEM (scanning electron microscope) is from 10 to 200 nm.

4. The thermoplastic molding composition according to claim 1, in which the primary particle size of component $C_2$) measured by SEM is from 0.1 to 50 μm.

5. The thermoplastic molding composition according to claim 1, in which the particle size distribution of the stabilizer mixture C) measured by laser granulometry is from 0.1 to 50 μm.

6. The thermoplastic molding composition according to claim 1, in which the BET surface area of component C) to ISO 9277 under nitrogen is from 10 to 80 $m^2/g$.

7. The thermoplastic molding composition according to claim 1, in which component D) is composed of an ethylene copolymer which comprises from 0.1 to 20% by weight of functional monomers.

8. The thermoplastic molding composition according to claim 1, where component D) comprises functional monomers selected from the group of the carboxylic acid, anhydride, carboxamide, carboximide, amino, hydroxy, epoxy, urethane, oxazoline groups, and mixtures of these.

9. A process for producing fibers, foils, and moldings which comprises utilizing the thermoplastic molding compositions according to claim 1.

10. A fiber, foil, or molding obtainable from the thermoplastic molding compositions according to claim 1.

* * * * *